United States Patent [19]

Heisel et al.

[11] Patent Number: 5,035,810

[45] Date of Patent: Jul. 30, 1991

[54] PROCESS FOR TREATING WASTEWATER WHICH CONTAINS SOUR GASES

[76] Inventors: Michael Heisel, Gistlstrasse 54, 8023 Pullach; Josef Sporer, Fasanenweg 5, 8121 Wielenbach, both of Fed. Rep. of Germany

[21] Appl. No.: 450,311

[22] Filed: Dec. 15, 1989

[30] Foreign Application Priority Data

Dec. 17, 1988 [DE] Fed. Rep. of Germany ....... 3842599

[51] Int. Cl.⁵ .................. B01D 19/00; C02F 1/20; C02F 1/58; C02F 1/74
[52] U.S. Cl. .................................. 210/750; 210/758; 210/765; 210/916; 55/73
[58] Field of Search ............... 210/758, 765, 916, 194, 210/195.1, 750, 805; 423/574 R, 567 R, 222, 540, 522, 531; 55/73

[56] References Cited

U.S. PATENT DOCUMENTS

| | | | |
|---|---|---|---|
| 3,079,238 | 2/1963 | Handwerk | 423/574 R |
| 3,821,110 | 6/1974 | Luetzelschwab | 210/750 |
| 3,822,341 | 7/1974 | Smith | 423/574 R |
| 3,896,215 | 7/1975 | Bratzler et al. | 423/574 R |
| 4,340,489 | 7/1982 | Adams et al. | 210/750 |

OTHER PUBLICATIONS

Becker et al., "Linde-SOLINOX Waste Gas Desulphurization Plant of the Bleiberger Bergwerks Union" (Mining Union of Bleiberg, BBU), Linde Reports on Science and Technology, vol. 44, 1988, pp. 48–59.

Primary Examiner—Stanley Silverman
Assistant Examiner—Neil M. McCarthy
Attorney, Agent, or Firm—Millen, White & Zelano

[57] ABSTRACT

For the treatment of a wastewater containing sour gases with a stripping gas, resultant stripping gas containing the sour gases is introduced into at least one combustion stage within the total process for recovery of the sulfur-containing components, the wastewater being stripped with at least a portion of the amount of $O_2$-containing gas required in the subsequent combustion stages.

15 Claims, 1 Drawing Sheet

PROCESS FOR TREATING WASTEWATER WHICH CONTAINS SOUR GASES

BACKGROUND OF THE INVENTION

This invention relates to a process for the treatment of wastewater containing sour gases, for example, $SO_2$, $H_2S$, and/or $CO_2$, and in particular to a process wherein the wastewater is stripped with a stripping gas, and the resultant stripping gas containing the sour gases is introduced into a combustion stage.

Wastewater containing sour gases is formed in many scrubbing processes directed to waste gas purification, inasmuch as a water scrubbing step normally takes place prior to the main physical or chemical scrubbing step. Besides cooling the waste gas, this water scrubbing step also provides for effective preliminary purification. During the water scrubbing step the temperature drops far below the $H_2O$ dewpoint of the waste gas. Therefore, a substantial proportion of the water vapor contained in the waste gas is condensed. Depending on whether the waste gas has already been prepurified, for example, in a Claus facility, the water vapor may also constitute water of reaction which, in order to increase the yield, is removed prior to the actual sour gas scrubbing operation.

In a conventional process of this type, a gas rich, for example, in $H_2S$ is fed into a Claus furnace and subsequently undergoes an incineration stage as well as an $SO_2$ scrubbing operation. In this procedure, an $SO_2$-containing wastewater is removed from the bottom of the preliminary water scrubbing column, and this wastewater must not be discharged without treatment.

It is also known that oil refineries and coke oven plants often produce wastewater that contains sour gases. Thus, numerous refinery gases, liquids, and coke oven gases which come into contact with water and/or steam during their various conversion processes, result in so-called "sour water". This contaminated water contains, among other components, ammonia and hydrogen sulfide in dissolved form and, therefore, can never be directly discharged.

There are various procedures for treating sour wastewaters to make them sufficiently nonpolluting. For example, the wastewaters from water scrubbing stages provided upstream of $SO_2$ and $H_2S$ scrubbing operations are frequently treated by means of neutralization and sedimentation. However, the drawbacks of this procedure are that large quantities of salt must be transported, and the water, subsequently discharged into a main sewer system, has a higher chemical oxygen demand (COD), since it contains reaction products, for example, sulfides, sulfites, and/or sulfates of calcium or sodium.

Another conventional process for the treatment of wastewater containing sour gases is to strip the wastewater by means of a gas and then feed the resultant gas containing the sour gases into a combustion stage. Suitable stripping gases in this connection are steam, air, and other $O_2$-containing gases. In addition to the stripping gas, conventional processes also generally require the use of supplemental air or some other $O_2$-containing gas in order to ensure an optimum reaction in the combustion stage, as described in U.S. Pat. No. 3,821,110.

In order to obtain wastewater of maximum purity, sufficiently large quantities of stripping gas and equipment to handle same are necessary. This can have an adverse effect on the economy of the process. On the other hand, if a lesser amount of stripping gas is used, wastewater that is more polluted is discharged into the sewer system. Moreover, the type of incorporation of the wastewater treatment within the total process is not optimal with respect to initial outlay and operating costs.

SUMMARY OF THE INVENTION

Therefore, it is an object of the present invention to provide an improved process as described above for the treatment of a wastewater containing sour gases in such a way that an optimally pure and reusable effluent is produced in a simple and economical way, and further that the resultant stripping gas is used in a manner which increases the economy of the entire process.

Upon further study of the specification and appended claims, further objects and advantages of this invention will become apparent to those skilled in the art.

These objects are attained in accordance with the invention by stripping the wastewater from the sour gases with an $O_2$-containing gas which is subsequently passed on to at least one combustion stage within the entire process for the recovery of the sulfur-containing components, the wastewater being stripped with at least a portion of the amount of $O_2$-containing gas required in the subsequent combustion stages.

In an especially advantageous way, air or oxygen is used herein as the $O_2$-containing gas.

Based on the idea that in any large-scale industrial process including a combustion stage there must be made available air and/or $O_2$ for the combustion, which materials should be utilized with maximum versatility, the provision is made in accordance with this invention that the $O_2$-containing gas after stripping is passed to a Claus furnace and/or a Claus waste gas incineration stage. However, it may also prove to be advantageous to feed the gas, after stripping, to a combustion stage wherein fossil fuels are burned, for example, a power plant boiler or a roasting furnace. It is, of course, likewise feasible to subdivide the stripping gas among the aforementioned combustion stages.

In an especially advantageous way, the wastewater to be rendered nonpolluting in accordance with this invention stems at least in part from an $SO_2$ scrubbing operation.

With a view toward the aspect that, according to this invention, a substantially closed process is desirable, insofar as the process is to be performed with optimally low operating costs and, if at all possible, without the formation of waste products, it is advantageous to introduce the stripping gas into a combustion stage connected upstream of the $SO_2$ scrubbing stage. In this way, recovery of the sulfur-containing components, as a reusable raw material, is ensured.

For example, Claus facilities require in at least two places, air and/or $O_2$ or $O_2$-enriched air. According to the invention, this air is utilized, prior to being used in the Claus facility, for stripping the wastewater from $H_2S$ or $SO_2$ scrubbing operations, or for stripping sour water resulting from coke ovens or oil refinery operations.

Thereby, the subsequent scrubbing operations do not require a larger scale. In contrast thereto, if pure gas from the downstream scrubbing operations is utilized as the stripping gas, a portion of the gas passes the scrubbing stage twice, requiring a larger size of equipment.

The sour gas content in the resultant stripping gas does not interfere during the use thereof as combustion air inasmuch as the combustion stages produce SO₂ in any case, which SO₂ is subsequently passed on to further processing. The CO₂ that may be dissolved in small amounts in the wastewater and thus is also contained in the stripping gas is of little consequence in a subsequent scrubbing operation.

The quantity of combustion air typically required in Claus facilities or power plants makes it possible to strip the wastewater down to a few ppm of residual sour gas content. Thereby, the consumption of elements for any final cleaning of the wastewater is substantially reduced. In certain cases, the final cleaning step can be omitted entirely. Thus, instead of a chemically polluted wastewater, a wastewater is thus discharged in this way which contains only a low level of pollutants.

In general, the amount of air or O₂ containing gas used for stripping is much less than that required for combustion in the particular process involved, e.g., a Claus process or power plant. Typically, 10 to 20 percent of the air required to incinerate a Claus tail gas is required to strip the wastewater so that only traces of sour gases remain dissolved. Whereas this type of operation is preferred in most cases, it is also possible to use a stoichiometric amount of air, as required for the combustion. This procedure, however, has only a minor effect on further reducing the sour gas content of the wastewater, as the content is reduced to trace levels with much less air.

In accordance with an embodiment of the process of this invention, the wastewater is subjected, after stripping, also to a neutralization step with hydroxides of alkali or alkaline earth metals. During this step, sulfides and, respectively, sulfites are usually formed in the wastewater which, in turn, generate during waste treatment a high COD (Chemical Oxygen Demand). By means of the subsequently performed stripping of the wastewater in accordance with this invention with an O₂-containing gas, a substantial portion of the sulfides and/or sulfites is oxidized advantageously to inert sulfates; this proceeds, for example, according to the following reaction equations:

$$SO_2 + Ca(OH)_2 \rightarrow CaSO_3 + H_2O \tag{1}$$

$$CaSO_3 + \tfrac{1}{2}O_2 \rightarrow CaSO_4 \tag{2}$$

The thus-formed sulfates can be separated from the purified wastewater in a simple manner.

According to a preferred embodiment of the process of this invention, the provision is made that, in a single column, the wastewater is first stripped with the O₂-containing gas at the top portion of the column and subsequently is subjected to neutralization with hydroxides of alkali or alkaline earth metals below said top portion of the column. Thus, the stripping gas is utilized in the same column for the oxidation of the sulfides/sulfites formed during neutralization into sulfates.

Although the amount of stripping gas in most cases is large as compared with the amount of wastewater to be treated, since the amount of stripping gas is, for example, equal to the amount of air required in the combustion stages, the additional pressure drop in the stripping column causes only a slightly increased energy consumption, and this is counterbalanced by far by the very satisfactory wastewater quality and the saving in initial investment and operating costs as compared to conventional wastewater treatment.

A further possibility of using the process according to this invention resides in removing pollutants from the water from the head of the regenerating column arranged downstream of the scrubbing operation, where water is utilized for scrubbing in order to remove traces of scrubbing agent. In this way, the sour gas content in the pure gas can be markedly reduced, for example, by 15%. For additional details of this type of process, reference is invited to H. Becker et al., Linde Report on Science and Technology, No. 44, 1988, pp. 48–59.

In a further development of the idea of this invention, the provision is furthermore made that the wastewater, after stripping, is utilized further within the process. It is especially advantageous to use the wastewater, after stripping, in cooling water cycles of the process. This is possible because by the saturation of the stripping gas with water, a heating up of the gas by about 10° C. from an inlet temperature close to ambient is, firstly, attained, which is energetically advantageous for the subsequent combustion processes and, secondly, a cooling of the wastewater is achieved by, e.g., about 43° C. from an inlet temperature as attainable by a quench, e.g., of about 70° C. Thus, wastewater cooling with cooling water and/or air can be reduced or eliminated. In particular, the stripped, relatively cold wastewater can even be used itself as cooling water, for example, for cooling the turbocompressor of an SO₂ scrubbing operation in areas where no cooling water is available.

In accordance with another preferred embodiment of the process of this invention, the wastewater is utilized, after stripping, in place of steam condensate within the process. In areas where cooling water is hard to obtain, this embodiment affords the possibility of changing over from air coolers to substantially more effective cooling water cycles which are considerably more advantageous for the total energy balance, since the required so-called "make-up" water (necessary due to evaporation) is available in the form of the treated wastewater.

When using the process of this invention in connection with H₂S- and/or SO₂-containing wastewaters, the advantage is achieved that the sulfur yield is improved if the stripping gas is subsequently processed to elemental sulfur in a Claus installation.

In total, the invention provides a simple process for the treatment of wastewaters that contain sour gases, minimizing the wastewater problem in an economical and energy-saving way. In this context, it is to be noted, in particular, that the purified wastewater, as well as the stripping gas containing the sour gases, are reused in the total process and thus the economy of the process as a whole is improved. Also, the waste disposal problem, otherwise prevalent in the wastewater treatment technology, is reduced or eliminated.

The invention is applicable to all processes containing at least one combustion stage and processing a wastewater that contains sour gases. This holds true, in particular, for Claus facilities having a subsequent H₂S or SO₂ scrubbing unit for Claus tail gas purification. However, the invention is likewise usable in coke oven plants, ore roasting facilities, and power plants with subsequently arranged waste gas purification systems.

BRIEF DESCRIPTION OF THE DRAWING

The invention will be described in greater detail with reference to the drawing which is a schematically illustrated embodiment in the form of a block diagram.

DETAILED DESCRIPTION OF THE DRAWING

Figure 1:
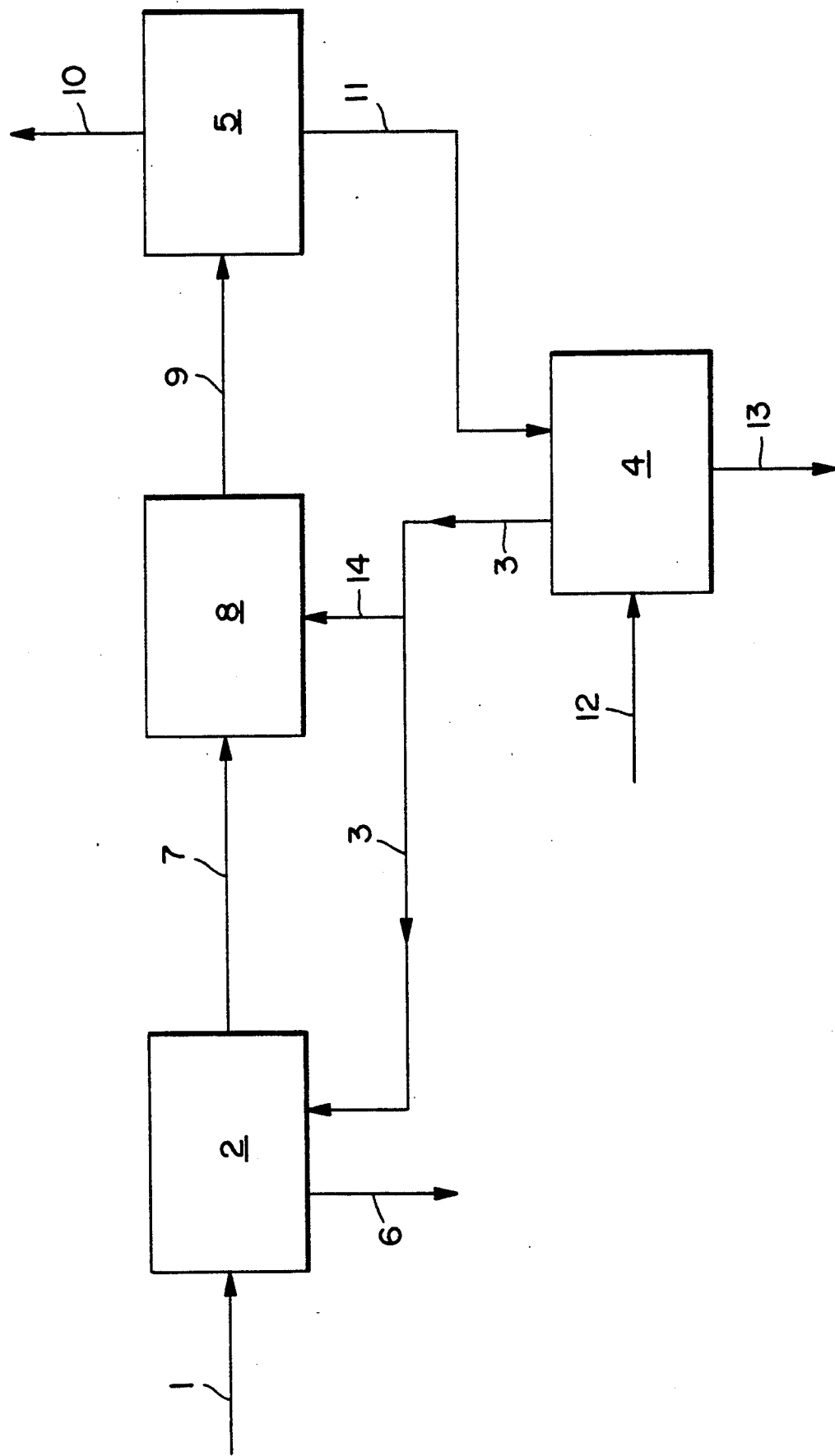

According to FIG. 1, an $H_2S$-containing gas stream is introduced via conduit 1 with a temperature of 140° C. and under a pressure of 1.6 bar into a Claus facility 2 which also comprises a Claus furnace, and is combusted therein in a substoichiometric manner. The combustion air required for the combustion is fed via conduit 3. This involves a portion of the stripping gas from the stripping 4 of the substantially $SO_2$-containing wastewater stemming from an $SO_2$ scrubbing operation 5, for example, a physical one, with a mixture of polyethylene glycol ethers, and from a water scrubbing stage arranged upstream thereof.

Sulfur is obtained by means of the substoichiometric combustion in the Claus facility 2; this sulfur is discharged via conduit 6. Furthermore, a waste gas is produced, the so-called Claus tail gas, which is then, via conduit 7, introduced into an incineration stage 8 in order to convert residual $H_2S$ into $SO_2$. This gas, at this point then containing merely $SO_2$ as the pollutant, is then via conduit 9 subjected to final cleaning in the $SO_2$ scrubbing stage 5, and the pure gas is discharged via conduit 10. Since in the $SO_2$ scrubbing operation, besides the loaded solvent subsequently subjected to regeneration (not shown), an $SO_2$-containing wastewater is obtained which cannot be passed on in this form, for example, into the sewer system or into natural bodies of water, this wastewater is passed on according to this invention via conduit 11 to the stripping stage 4. Stripping takes place by means of stripping gas fed via conduit 12, such as air, for example. After the stripping operation 4 has been accomplished, pure water is withdrawn via conduit 13.

According to the invention, a substantially closed total process is involved; and, thus, by means of conduit 12, air is passed on to the stripping stage 4 that ensures, during the subsequent use of the stripping gas in the Claus facility 2 and in the incinerator 8 (feed by way of conduit 14), the respectively desired combustion.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

In the foregoing and in the following example, all temperatures are set forth uncorrected in degrees Celsius; and, unless otherwise indicated, all parts and percentages are by weight.

The entire disclosures of all applications, patents and publications, cited above and below, and of corresponding West German Application No. P 38 42 599.8, filed Dec. 7, 1988, are hereby incorporated by reference.

EXAMPLE

To exemplify the invention quantitatively, several numerical values are set forth below in connection with the above-described embodiment:

$H_2S$-Containing Feed Stream $N_2$ 0.0284 mol-%
$CO_2$ 13.0326 mol-%
$CH_4$ 0.1235 mol-%
$C_{2+}$ 0.1015 mol-%
$H_2S$ 81.3479 mol-%
$H_2O$ 5.366 mol-%

Gas from the Incinerator $N_2$ 60.5072 mol-%
$O_2$ 0.6451 mol-%
$SO_2$ 3.9714 mol-%
$CO_2$ 5.8877 mol-%
$H_2O$ 28.9868 mol-%
as well as traces of $H_2S$ and NO.

Wastewater from the $SO_2$ Scrubbing Operation $H_2O$ 99.9572 mol-%
$SO_2$ 0.0402 mol-%
as well as traces of $N_2$, $O_2$, and $CO_2$.

Pure Water $H_2O$ 99.9978 mol-%
as well as, in approximately equal parts, traces of $SO_2$, $CO_2$, and $N_2$.

In general, the concentrations of the sour gases in wastewater streams analogous to conduit 11 are about 0.05 mol-%.

Likewise, the concentration of the sour gases in the resultant stripping gas passed to combustion, analogous to conduit 3, is about 0.3 mol-%.

In contradistinction, a crude gas stream containing sour gases, analogous to conduit 1, generally contains at least about 90 mol-%, mostly $H_2S$ and $CO_2$.

Stripping Gas $N_2$ 77.77 mol-%
$O_2$ 20.63 mol-%
$CO_2$ 0.35 mol-%
$SO_2$ 0.33 mol-%
$H_2O$ 0.92 mol-%

The preceding example can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the treatment of wastewater containing dissolved sour gas consisting essentially of $SO_2$ and essentially free of $H_2S$, comprising stripping the wastewater with a stripping gas, and introducing resultant stripping gas containing the sour gases into a combustion stage, the improvement wherein the stripping gas is a gas containing at least about 21 mol % $O_2$, and the resultant stripping gas is fed to at least one combustion stage within a process for recovering sulfur-containing components from a crude gas, said combustion stage being a Claus tail gas incineration unit.

2. A process according to claim 1, wherein the $O_2$-containing gas is air.

3. A process according to claim 1, wherein the $O_2$-containing gas is oxygen.

4. A process according to claim 1, wherein the resultant stripping gas is also introduced into a Claus furnace.

5. A process according to claim 1, wherein the wastewater is at least in part from an $SO_2$ scrubbing operation.

6. A process according to claim 5, wherein the resultant stripping gas is introduced to a combustion stage upstream of the $SO_2$-scrubbing operation.

7. A process according to claim 1, wherein resultant stripping gas is also passed on to a combustion stage wherein fossil fuels are burned.

8. A process according to claim 1, further comprising subjecting the wastewater, prior to stripping, to neutralization with hydroxides of alkali or alkaline earth metals.

9. A process according to claim 8, the $O_2$-containing gas is to oxidize at least one of sulfides and sulfites, formed during neutralization, into a sulfate.

10. A process according to claim 9, wherein in a single column, first the wastewater is stripped with the $O_2$-containing gas and subsequently is subjected to neutralization with hydroxides of alkali or alkaline earth metals wherein the stripping gas also oxidizes the sulfides/sulfites, formed during neutralization, into sulfates.

11. A process according to claim 1, further comprising partially recycling resultant wastewater, after the stripping step, into the stripping gas to saturate the stripping gas with water to increase the temperature of the stripping gas and simultaneously cool the resultant wastewater.

12. A process according to claim 8, wherein the wastewater after stripping and neutralization is used in an open cooling tower, where the sulfides formed during neutralization are oxidized to sulfates.

13. A process according to claim 1, wherein the wastewater prior to stripping contains about 0.05 mol % sour gas.

14. A process according to claim 1, wherein said resultant stripping gas contains about 0.3 mol % sour gas.

15. A process according to claim 13, wherein the resultant stripping gas contains about 0.3 mol % sour gas.

* * * * *